United States Patent [19]

Livermore

[11] 4,420,840
[45] Dec. 13, 1983

[54] INTRINSICALLY SAFE PHOTOELECTRIC SENSING

[76] Inventor: Thomas R. Livermore, 2283 Manor Ct., Clearwater, Fla. 33515

[21] Appl. No.: 293,339

[22] Filed: Aug. 17, 1981

[51] Int. Cl.³ .............................................. H04B 9/00
[52] U.S. Cl. ................................... 455/606; 358/700; 340/870.29
[58] Field of Search ................ 455/606; 358/100, 98; 340/870.29, 630

[56] References Cited

U.S. PATENT DOCUMENTS

| | | |
|---|---|---|
| 2,989,623 | 6/1961 | Byrne . |
| 3,417,390 | 12/1968 | Turtle ............................ 340/870.29 |
| 3,619,629 | 11/1971 | Matthews . |
| 3,624,449 | 11/1971 | Morgan . |
| 3,631,264 | 12/1971 | Morgan . |
| 3,813,578 | 5/1974 | Tiffany . |
| 3,997,733 | 12/1976 | Sanders . |
| 4,021,665 | 5/1977 | Haas et al. . |
| 4,096,382 | 6/1978 | Numata et al. . |
| 4,207,464 | 6/1980 | Fukuyama et al. . |
| 4,211,923 | 7/1980 | Fukuyama et al. . |
| 4,217,492 | 8/1980 | Fayfield . |
| 4,260,981 | 4/1981 | Yamauchi .......................... 340/630 |
| 4,264,897 | 4/1981 | Farmsworth .................. 340/870.29 |

*Primary Examiner*—Robert L. Griffin
*Assistant Examiner*—Edward L. Coles
*Attorney, Agent, or Firm*—Cushman, Darby & Cushman

[57] ABSTRACT

An intrinsically safe sensing system does not degrade the output signal from the sensor in a hazardous environment, and is simple and efficient. Necessary circuitry is mounted on a single module in a safe area. A transmitting circuit has a transistor mounted on the hazardous end of the barrier, the barrier being located in the safe area, and connects through a cable to a photoelectric transmitter located in the hazardous area. A receiving circuit has an amplifier mounted on the "hazardous" end of the barrier, so that the signal from a photoelectric receiver within the hazardous area is not degraded. The photoelectric transmitter and receiver are ac coupled.

14 Claims, 4 Drawing Figures

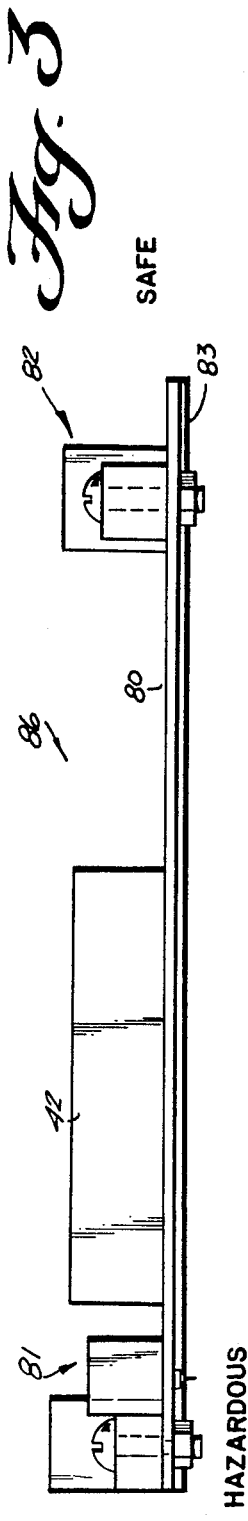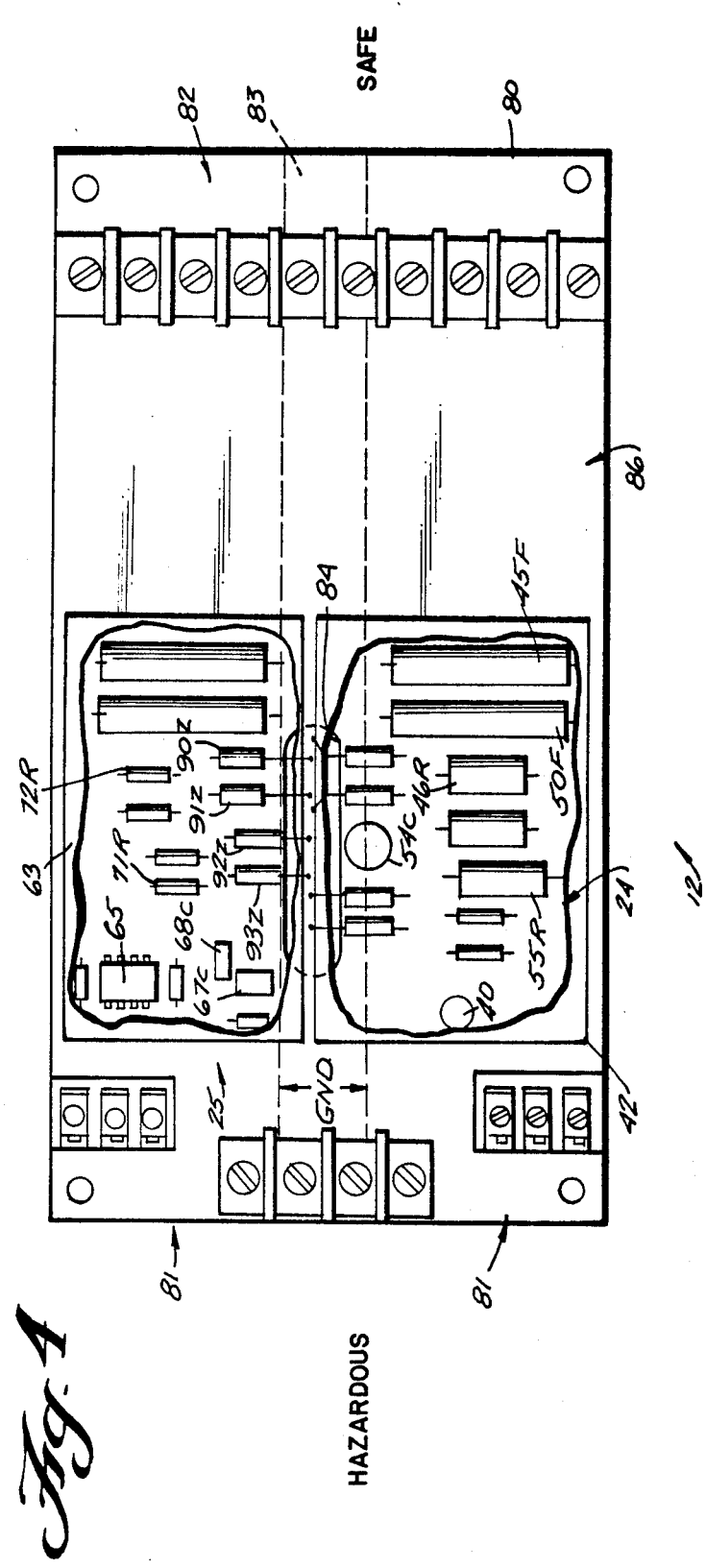

INTRINSICALLY SAFE PHOTOELECTRIC SENSING

BACKGROUND AND SUMMARY OF THE INVENTION

In the practice of many industrial and chemical processes, hazardous environments may be present. For instance in ammunition plants, coal mines, grain processing plants, and chemical plants, hazardous environments can exist such that if a wire fault or other electrical abnormality creates a spark, or if the temperature of electrical devices operating in the hazardous environments becomes too high, an explosive condition can occur. Therefore when electrical components, such as sensing systems for detecting the presence of an object, are utilized, it is necessary to limit the electrical energy to and temperature of the sensing components within the hazardous environments.

Conventional techniques for limiting electrical energy to, and the temperature of, electrical components within a hazardous environment (such as photoelectric sensing mechanisms) commonly include the use of a separate energy limiting safety barrier in series with each signal lead to the hazardous environment (see American National Institute Report RP 12.6, Installation of Intrinsically Safe Instrument Systems in Class 1 Hazardous Locations). Such techniques have very reduced sensitivity of the photoelectric sensors or the like used in the hazardous environment, and are expensive due to the addition of components and assembly time. Another technique commonly used (see National Electrical Code of the National Fire Protection Association, 1978, Chapter 5) is the use of explosion-proof wiring to each sensor. This technique is very expensive and for that reason undesirable in many situations. Thus, there is a need for an intrinsically safe sensing system (and simple component parts therefor) which effect energy and temperature limitation without degradation of the sensor return signal, and which provides for safety and in simple, inexpensive manner.

According to the present invention, this need for an intrinsically safe sensing system which does not degrade the return signal from the sensor, and which provides its energy and temperature limiting functions in a simple and inexpensive manner, is satisfied. A sensing system according to the present invention includes a photoelectric sensing means including a photoelectric transmitter and a photoelectric receiver. Circuitry means operatively interconnect the photoelectric sensing means to a power source, the circuitry means including electrical barrier means for limiting the energy to the sensing means to a safe level. An electrical cable extends between the photoelectric sensing means and the circuitry means, the cable being long enough to provide for positioning of the sensing means in the hazardous area and positioning of the circuitry means in the safe area. The circuitry means are provided in a single module located in the safe area.

The circuitry means comprises a transmitting circuit with barrier means, and a receiving circuit with barrier means. The transmitting circuit includes a transistor electrically interconnected between the cable and the transmitting circuit barrier means, and the receiving circuit includes a preamplifier connected between the cable and the receiver circuit barrier means, so that a signal from the photoelectric receiver will pass through the barrier means without significant degradation. The circuitry means further comprises means for supplying a low frequency ac current to the photoelectric transmitter and for receiving the low frequency ac current from the photoelectric receiver, the photoelectric transmitter and receiver being ac coupled.

The present invention is ideally suited for use with photoelectric sensing means, although various aspects of the invention may be practiced in conjunction with other types of sensing means. One feature particularly related to the cost and size reduction goals desirably achieved according to the invention is the utilization of a single module mounting the circuitry means. The module includes a base having a safe area end and a hazardous area end, with a first set of terminals on the safe area end of the base and a second set of terminals on the hazardous area end. The transmitting and receiving circuits are mounted on the base electrically connected between the first and second terminal sets, and means are provided for encapsulating the transmitting and receiving circuits to prevent access thereto, while allowing testing thereof. Signal processing circuitry, an output signal activated relay, and an oscillator and phase detector are also mounted on the base, the module thus comprising the only component that need be provided between the power supply and the electrical cable extending to the sensor within the hazardous area.

It is the primary object of the present invention to provide a simple, efficient, and cost-effective intrinsically safe sensing system, and components therefor. This and objects of the present invention will become clear from an inspection of the detailed description of the invention and from the appended claims.

BRIEF DESCRIPTION OF THE DRAWINGS

FIG. 3 is a side view of an exemplary module utilized in the system of FIG. 1; and FIG. 4 is a top plan view of the module of FIG. 3, with portions cut away for clarity of illustration.

DETAILED DESCRIPTION OF THE DRAWINGS

Figure 1:
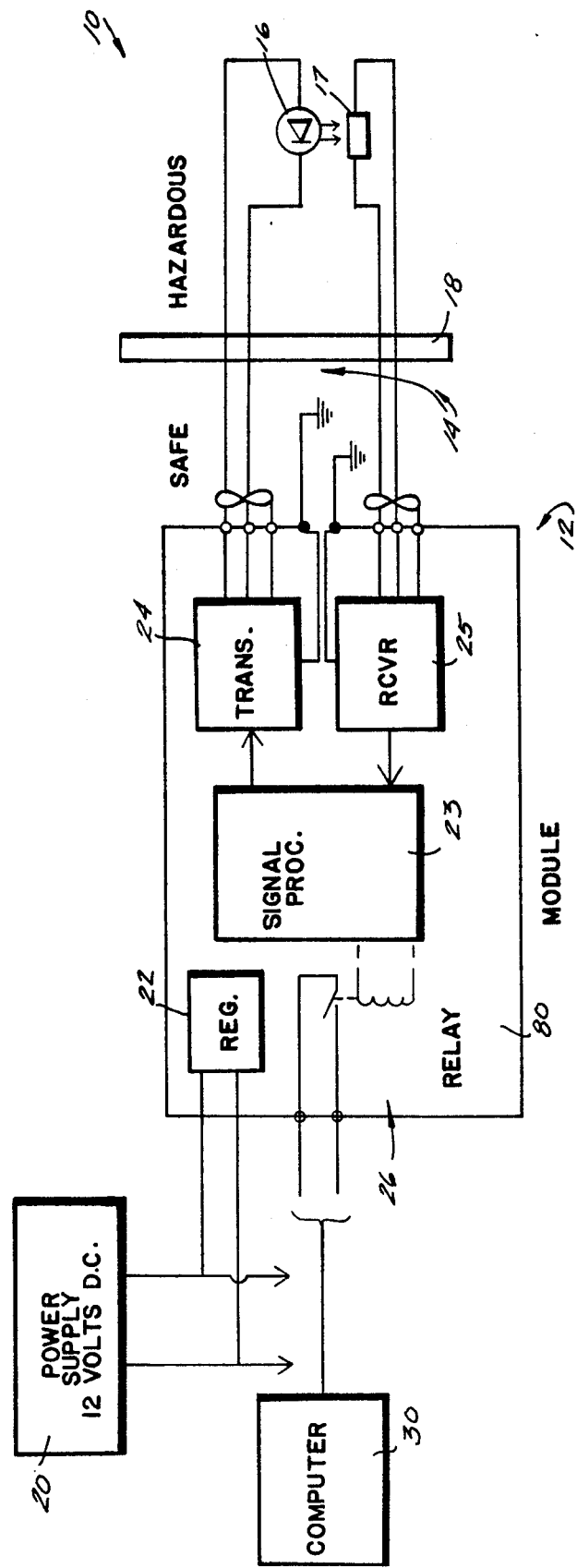
FIG. 1 is a schematic block diagram showing main components of an examplary intrinsically safe sensing system according to the present invention.

In the following description of the drawings, reference numerals followed by a C identify capacitors, reference numerals followed by an F identify fuses, reference numerals followed by an R identify resistors, and reference numerals followed by a Z identify Zener diodes.

Basic components of an intrinsically safe sensing system according to the present invention are illustrated schematically in FIG. 1. Some basic components include the sensing means 10, module 12, and cables 14 interconnecting the sensing means 10 and module 12.

The sensing means 10 preferably comprises a photoelectric sensing means including a photoelectric transmitter 16 and a photoelectric receiver 17. The photoelectric transmitter and receiver 16, 17 are mounted in a hazardous area, separated by a wall 18 or the like from a safe area. For instance, the hazardous area could be a munitions loading room, grain processing area, or the like. The sensing means 10 could be utilized with machinery in the hazardous area to detect the presence of an object, or opaqueness of the object. The components 16, 17 can be associated with any portion of the electromagnetic energy spectrum from the far infrared to the ultraviolet region. One exemplary form that the photoelectric transmitter 16 can take is a light emitting diode (see FIG. 2), while one form that photoelectric receiver 17 can take is a light sensitive diode (see FIG. 2).

The module 12 comprises all of the circuitry necessary to operatively interconnect the sensing means 10 to a power supply 20 in an intrinsically safe manner. Typical circuitry that may be provided with the module 12 includes a voltage regulator 22, signal processing circuitry 23 (including an oscillator and phase detector), a transmitting circuit 24, a receiving circuit 25, and an output signal responsive relay 26. Power from the supply 20, such as a 12-volt dc supply, passes through the voltage regulator 22 and powers the transmitting and receiving circuits 24, 25. Additionally a line from the regulator 22 extends to the signal processor 23 which provides an input signal to the transmitting circuit 24 and receives an output signal from the receiver circuit 25.

The transmitting circuit 24 output signal is passed to the photoelectric transmitter 16, the signal preferably being low frequency ac (e.g. 15 kilohertz). The photoelectric receiver 17 is operational only when the transmitter 16 is operational, being interconnected to the receiving circuit 25. The ac output signal from the photoelectric receiver 17 passes to receiving circuit 25 and ultimately to the signal processor 23, and this output signal can be utilized to perform any further desired operation, or activate any further desired device.

For the exemplary embodiment illustrated in FIG. 1, if an abnormal signal (or no signal at all) is received by the signal processor 23, the relay 26 may be activated, which in turn operates a computer 30 which effects controls of any desired equipment, indicators, or the like to correct, monitor, or indicate the occurrence which initiated the signal that activated relay 26. Alternatively, the signal processor could be directly connected up to an indicator light, warning bell, or other component.

Figure 2:
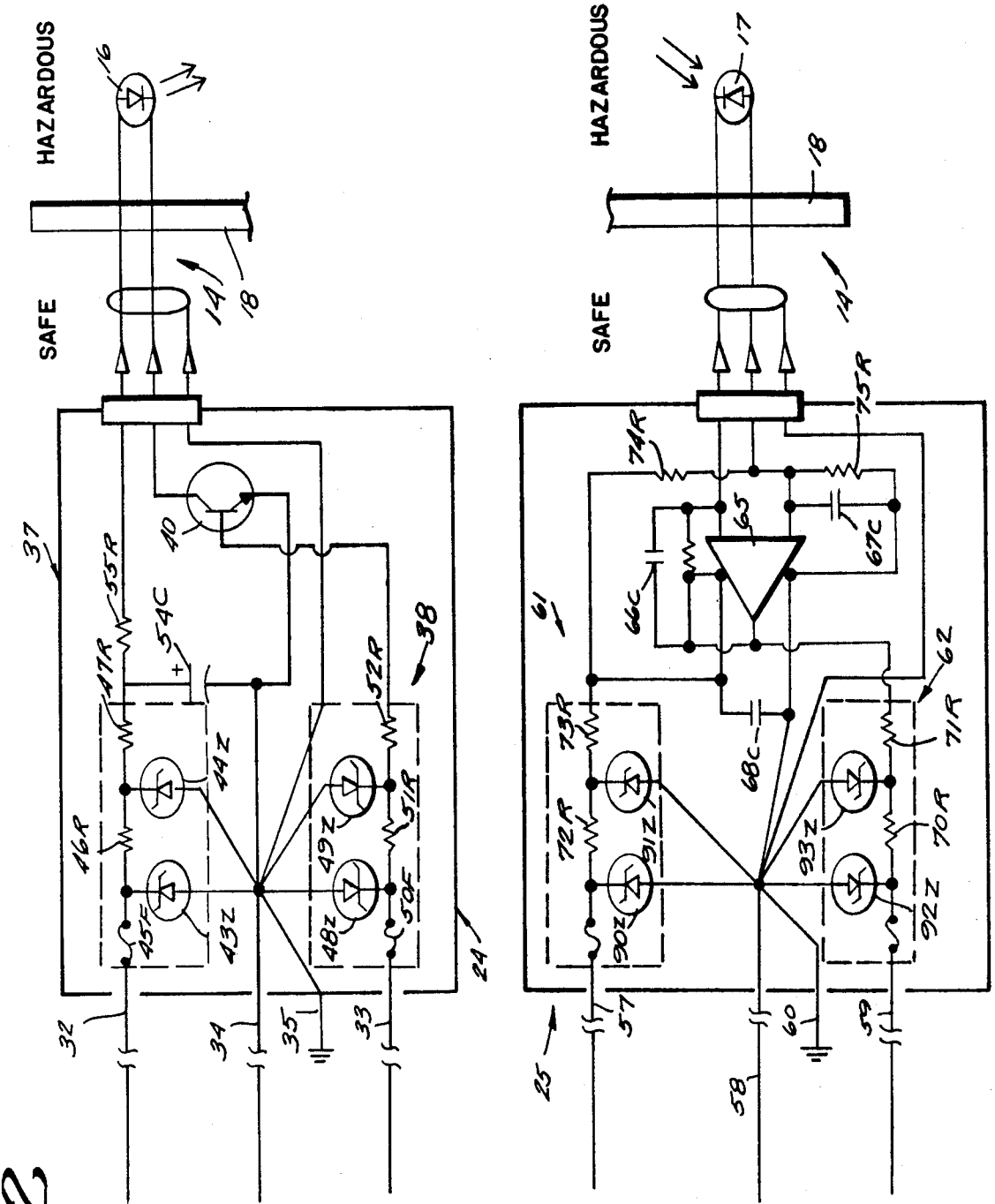
FIG. 2 is a schematic electrical diagram showing the transmitting and receiving circuits of the system of FIG. 1 in detail.

Details of the exemplary transmitting and receiving circuits 24, 25 according to the present invention are illustrated in FIG. 2. Four lines lead to and from the transmitter circuit 24, a 12-volt dc supply line 32, a 12-volt dc return line 34, a drive signal line 33, and a common ground line 35. The positive power supply line 32 is connected through electrical barrier means, illustrated generally by reference numeral 37, to the cable 14. The signal line 33 connects through barrier means 38 to the base of transistor 40. The common reference connects to ground through line 35.

The circuitry 24 is designed with constraints on capacitive values and resistors to limit the amount of energy that is available to the hazardous area. The entire circuit 24 is encapsulated, as illustrated by the cover 42 (see FIGS. 3 and 4).

The barrier means 37 includes Zener diodes 43Z and 44Z, fuse 45F, and resistors 46R and 47R. The barrier means 38 includes Zener diodes 48Z and 49Z, fuse 50F, and resistors 51R and 52R. The functions of the components of the barrier means 37, 38 are basically the same, and only the barrier means 37 will be described.

Zener diodes 43Z and 44Z provide redundant voltage limiting for the input signals. Fuse 45F provides protection for the elements 43Z, 44Z. The recommended test for Zener failure is to test the Zener at twice the fuse current or ten times the fuse opening time. If the Zener 43Z fails, 44Z will handle the current, providing the redundant protection. Resistor 46R allows individual testing of both 43Z, 44Z from external terminals. 47R provides current limiting to the hazardous area.

The value of the capacitor 54C may be large in order to provide the high current pulses necessary for the drive of photoelectric transmitter 16. Capacitor 54C is in series with the resistor 55R.

A distinguishing feature of the circuit 24 is the positioning of the transistor 40 on the "hazardous" side of the barrier means 37, 38.

The receiver circuit 25 has power supply leads 57, 58, signal lead 59, and common ground 60. The positive power supply lead 57 connects through an electrical barrier means 61, while the signal lead 59 connects through a similar barrier means 62. The barrier means 61, 62 are comparable to the barrier means 37, 38 described above with respect to the transmitting circuit, providing combinations of Zener diodes, resistors, and fuses.

The receiver circuit 25 is also designed with constraints on capacitor values and resistors to limit the amount of energy that is available to the hazardous area. The entire receiver subassembly is encapsulated, as illustrated by cover 63 in FIG. 4, much the same as the transmitter circuit 24.

A distinguishing feature of the receiver circuit 25 is the operative connection of preamplifier 65 to the "hazardous side" of the barrier means 61, 62. The power to the preamplifier 65 is provided through barrier means 61, and the signal from the preamplifier 65 is output to the safe area through the barrier means 62. The capacitors 66C, 67C, and 68C are small enough (e.g., 66C=100 microfarads, 66C=0.02 microfarad, and 68C=0.01 microfarad) so that series resistors are not required. The use of the preamplifier 65 yields a power gain for the signal which allows the signal to pass through the barrier means 62 without degradation of the signal as would occur if the preamplifier is placed after the barrier means 62. The preamplifier is illustrated as utilized in the transconductance mode, but may also be used in the standard voltage amplification mode.

Representative values of components described above may be as follows: 51R, 52R, 70R, 71R, 390 ohms; 72R, 73R, 39 ohms; 74R, 75R, 30 kiloohms; 46R, 47R, 33 ohms; 55R, 45 ohms; 54C, 22 microfarads.

According to the present invention, all of the circuitry components are mounted on a single module. The module, illustrated most clearly in FIGS. 3 and 4, comprises a base 80 which may be a sheet of electrically insulating material about 4"×6" in dimension. The base 80 includes a safe end and a hazardous end with a first set of terminals 81 mounted on the hazardous end, and a second set of terminals 82 mounted on the safe end. All the Zener diodes of the circuits 24, 25 can be connected to a ⅜" wide printed circuit ground rod. Alternatively, as illustrated in the drawings, a solid copper or cadmium-plated steel bar 83 which runs the length of the module may be provided. The Zeners are connected to the bar 83 by solder through a cutout 84 formed in the base 80. Two studs (not shown) may be attached to the bar 83 for use in connecting it to the ground system.

The circuits 24, 25 are located adjacent the safe end of the module 12, as illustrated in FIGS. 3 and 4, and are encapsulated as illustrated by covers 42 and 63. The covers 42, 63 may be filled with a thermally conductive epoxy during the assembly process to prevent modification or renewal of the module. The area, indicated generally by reference numeral 86 in FIGS. 3 and 4—between the covers 42, 63 and the hazardous end terminals 81 is provided for mounting other circuitry components, such as the signal processor 23. Appropriate printed circuits interconnect the other circuitry components with the terminals 81, 82 and/or circuits 24, 25. Conventional components may be utilized for the signal processor 23, voltage regulator 22, and relay 26.

The power supply 20 and the computer 30 are connected up to the module components via the safe end terminals 82, while the circuits 24, 25 are operatively connected to the cables 14, and ultimately the sensing means 10, through the hazardous end terminals 81.

It will thus be seen that according to the present invention an intrinsically safe sensing system is provided which provides energy and temperature limiting to the hazardous area yet allows the transmitter and detector to operate to full capability, and provides a unitized construction which minimizes manufacturing and installation costs.

While the invention has been herein shown and described in what is presently conceived to be the most practical and preferred embodiment thereof, it will be apparent to those of ordinary skill in the art that many modifications may be made there within the scope of the invention, which scope is to be accorded the broadest interpretation of the appended claims so as to encompass all equivalent structures and devices.

What is claimed is:

1. An intrinsically safe sensing system comprising:
a photoelectric sensing means including a photoelectric transmitter and a photoelectric receiver;
circuitry means for operatively interconnecting said photoelectric sensing means to a power source, said circuitry means including electrical barrier means for limiting the energy to said sensing means to a safe level;
electrical cable interconnecting means extending between said photoelectric sensing means and said circuitry means, said interconnecting means being long enough to provide for positioning of said sensing means in a hazardous area, and positioning of said circuitry means in a safe area; and
wherein said circuitry means is provided in a single module located in a safe area.

2. An intrinsically safe sensing system comprising:
a photoelectric sensing means including a photoelectric transmitter and a photoelectric receiver;
circuitry means for operatively interconnecting said photoelectric sensing means to a power source, said circuitry means including electrical barrier means for limiting the energy to said sensing means to a safe level;
electrical cable interconnecting means extending between said photoelectric sensing means and said circuitry means, said interconnecting means being long enough to provide for positioning of said sensing means in a hazardous area, and positioning of said circuitry means in a safe area; and
wherein said circuitry means comprises a transmitting circuit with barrier means, and a receiving circuit with barrier means; said transmitting circuit including a transistor electrically interconnected between said cable interconnecting means and said transmitting circuit barrier means; and said receiving circuit including a preamplifier electrically interconnected between said cable interconnecting means and said receiver circuit barrier means, so that a signal from said photoelectric receiver will pass through said barrier means withous significant degradation.

3. An intrinsically safe sensing system comprising:
a photoelectric sensing means including a photoelectric transmitter and a photoelectric receiver;
circuitry means for operatively interconnecting said photoelectric sensing means to a power source, said circuitry means including electrical barrier means for limiting the energy to said sensing means to a safe level;
electrical cable interconnecting means extending between said photoelectric sensing means and said circuitry means, said interconnecting means being long enough to provide for positioning of said sensing means in a hazardous area, and positioning of said circuitry means in a safe area; and
wherein said circuitry means comprises means for supplying a low frequency ac current to said photoelectric transmitter and for receiving low frequency ac current from said photoelectric receiver, said photoelectric transmitter and receiver being ac coupled.

4. An intrinsically safe sensing system comprising:
a sensing means;
circuitry means for operatively interconnecting said sensing means to a power source;
said circuitry means comprising: a transmitting circuit, with electrical barrier means for limiting the energy from said sensing means to a safe level; and a receiving circuit, with electrical barrier means for limiting the energy to said sensing means to a safe level;
electrical cable interconnecting means extending between said sensing means and said circuitry means, said interconnecting means being long enough to provide for positioning of said sensing means in a hazardous area, and positioning of said circuitry means in a safe area;
said transmitting circuit including a transistor electrically interconnected between said cable interconnecting means and said transmitting circuit barrier means;
said receiving circuit including a preamplifier electrically interconnected between said cable interconnecting means and said receiver circuit barrier means so that a signal from said sensing means will pass through said barrier means without significant degradation; and
said circuitry means being provided on a single module located in a safe area.

5. A single module for use in a safe area as part of an intrinsically safe sensing system, said module comprising:
a base of electrically insulating sheet material, having a safe area end and a hazardous area end;
a first set of terminals on said safe area end of said base;
a second set of terminals on said hazardous area end of said base;
a transmitting circuit mounted on said base, operatively electrically connected to said first and second terminal sets, and including: electrical barrier means for limiting the energy from said first set of terminals to said second set of terminals to a safe level; and a transistor, said transistor electrically connected between said barrier means and said second set of terminals;

a receiving circuit mounted on said base, operatively electrically connected to said first and second terminal sets, and including: electrical barrier means for limiting the energy to said first set of terminals from said second set of terminals to a safe level; and a preamplifier, said preamplifier electrically connected between said barrier means and said second set of terminals; and means for encapsulating said transmitting and receiving circuits to prevent access thereto, while allowing testing of said circuits.

6. A system as recited in claims 1 or 2 wherein said circuitry means further comprises means for supplying a low frequency ac current to said photoelectric transmitter and for receiving a low frequency ac current from said photoelectric receiver, said photoelectric transmitter and receiver being ac coupled.

7. A system as recited in claim 3 wherein said circuitry means further comprises a signal processing circuit, said circuitry means mounted on a single module located in the safe area.

8. A system as recited in claim 1 wherein said circuitry means comprises a transmitting circuit with barrier means, and a receiving circuit with barrier means, and wherein said transmitting and receiving circuits are each encapsulated on said module to prevent access thereto.

9. A system as recited in claim 8 wherein said transmitting circuit includes a transistor electrically interconnected between said cable interconnecting means and said transmitting circuit barrier means, and wherein said receiving circuit includes a preamplifier electrically interconnected between said cable interconnecting means and said receiver circuit barrier means, so that a signal from said photoelectric receiver will pass through said barrier means without significant degradation.

10. A system as recited in claim 5 wherein said base has a cutout formed therein disposed generally between said transmitting and receiving circuits; and wherein each of said transmitting and receiving circuits includes a plurality of Zener diodes; and an electrically conductive material bar dispose on said base on the opposite side thereof as said transmitting and receiving circuits and accessible through said cutout in said base; said Zener diodes electrically connected at one end thereof to said bar.

11. The system as recited in claims 2, 4, or 8 wherein said barrier means comprises a barrier circuit connected to each of the input and the drive signal line of said transmitting circuit, and to each of the input and the output signal line of said receiving circuit; and wherein each barrier circuit comprises a pair of resistors, a pair of Zener diodes, and a fuse.

12. A system as recited in claims 1, 2, or 3 wherein said photoelectric transmitter comprises a light emitting diode, and wherein said photoelectric receiver comprises a light sensitive diode.

13. A module as recited in claim 5 further comprising a signal processing circuit mounted on said base between said transmitting circuit and said receiving circuit, and said second set of terminals, and operatively electrically connected between said first set of terminals and said transmitting and receiving circuits.

14. A system as recited in claim 4 wherein said sensing means comprises photoelectric sensing means.

* * * * *